(12) United States Patent
Palanki et al.

(10) Patent No.: US 8,614,975 B2
(45) Date of Patent: Dec. 24, 2013

(54) SYNCHRONIZING A BASE STATION IN A WIRELESS COMMUNICATION SYSTEM

(75) Inventors: Ravi Palanki, San Diego, CA (US);
Parag A. Agashe, San Diego, CA (US);
Vikram Gupta, San Diego, CA (US);
Rajarshi Gupta, Santa Clara, CA (US);
Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 889 days.

(21) Appl. No.: 12/561,844

(22) Filed: Sep. 17, 2009

(65) Prior Publication Data

US 2010/0074180 A1 Mar. 25, 2010

Related U.S. Application Data

(60) Provisional application No. 61/098,360, filed on Sep. 19, 2008, provisional application No. 61/115,465, filed on Nov. 17, 2008.

(51) Int. Cl.
*H04W 4/00* (2009.01)
*H04J 3/06* (2006.01)

(52) U.S. Cl.
USPC .......................................... 370/328; 370/503

(58) Field of Classification Search
USPC .................................. 370/328, 503
See application file for complete search history.

(56) References Cited

U.S. PATENT DOCUMENTS

| | | | |
|---|---|---|---|
| 6,185,429 B1 | 2/2001 | Gehrke et al. | |
| 6,317,049 B1 | 11/2001 | Toubia et al. | |
| 6,317,474 B1 | 11/2001 | Carsello | |
| 7,233,800 B2 | 6/2007 | Laroia et al. | |
| 7,706,328 B2 | 4/2010 | Mukkavilli et al. | |
| 7,729,707 B2 | 6/2010 | Aljadeff et al. | |
| 7,813,383 B2 | 10/2010 | Wang et al. | |
| 7,817,616 B2 * | 10/2010 | Park et al. | 370/350 |
| 7,826,343 B2 | 11/2010 | Krasner | |
| 7,893,873 B2 | 2/2011 | Black et al. | |
| 7,940,740 B2 | 5/2011 | Krishnamurthy et al. | |
| 8,165,586 B2 | 4/2012 | Krishnamurthy et al. | |
| 8,228,923 B1 * | 7/2012 | Jain et al. | 370/395.62 |

(Continued)

FOREIGN PATENT DOCUMENTS

| | | |
|---|---|---|
| CN | 1288645 A | 3/2001 |
| CN | 1454013 A | 11/2003 |

(Continued)

OTHER PUBLICATIONS

3GPP TR 36.942 V8.1.0 (Dec. 2008), 3rd Generation Partnership Project: Technical Specification Group Radio Access Network; Evolved Universal Terrestrial Radio Access (E-UTRA); Radio Frequency (RF) system scenarios; (Release 8), Dec. 2008.

(Continued)

*Primary Examiner* — Mark Rinehart
*Assistant Examiner* — Angel Brockman
(74) *Attorney, Agent, or Firm* — Nerrie M. Zohn

(57) ABSTRACT

A method for synchronizing a wireless communication system is disclosed. A silence duration for a base station is determined based on the time required for a neighbor base station to obtain or maintain synchronization. All transmissions from the base station are ceased for the silence duration. Multiple base stations level may cease transmissions at the same time, thus mitigating interference.

72 Claims, 13 Drawing Sheets

(56) References Cited

U.S. PATENT DOCUMENTS

| | | | |
|---|---|---|---|
| 8,233,432 B2* | 7/2012 | Northcutt et al. | 370/328 |
| 2001/0004601 A1 | 6/2001 | Drane et al. | |
| 2001/0034238 A1 | 10/2001 | Voyer | |
| 2003/0036390 A1 | 2/2003 | Villier et al. | |
| 2003/0119523 A1 | 6/2003 | Bulthuis | |
| 2003/0189948 A1* | 10/2003 | Sashihara | 370/445 |
| 2004/0033808 A1 | 2/2004 | Rorabaugh | |
| 2005/0153653 A1 | 7/2005 | Diao et al. | |
| 2005/0192024 A1 | 9/2005 | Sheynblat | |
| 2005/0281247 A1 | 12/2005 | Lim et al. | |
| 2007/0040703 A1 | 2/2007 | Akkarakaran et al. | |
| 2007/0075899 A1 | 4/2007 | Inaba | |
| 2007/0121560 A1 | 5/2007 | Edge | |
| 2007/0176826 A1 | 8/2007 | Daniele et al. | |
| 2007/0177605 A1* | 8/2007 | Benco et al. | 370/395.4 |
| 2008/0125161 A1 | 5/2008 | Ergen et al. | |
| 2008/0126161 A1 | 5/2008 | Willis et al. | |
| 2008/0132247 A1 | 6/2008 | Anderson | |
| 2008/0137691 A1* | 6/2008 | Barry et al. | 370/503 |
| 2008/0232517 A1 | 9/2008 | Terabe et al. | |
| 2008/0274750 A1 | 11/2008 | Carlson et al. | |
| 2008/0285505 A1* | 11/2008 | Carlson et al. | 370/328 |
| 2009/0034459 A1* | 2/2009 | Shousterman et al. | 370/329 |
| 2009/0097452 A1 | 4/2009 | Gogic | |
| 2009/0149169 A1 | 6/2009 | Tanno et al. | |
| 2010/0014443 A1 | 1/2010 | Cristian et al. | |
| 2010/0029295 A1* | 2/2010 | Touboul et al. | 455/456.1 |
| 2010/0054237 A1 | 3/2010 | Han et al. | |
| 2010/0110983 A1 | 5/2010 | Fu | |
| 2010/0172311 A1 | 7/2010 | Agrawal et al. | |
| 2010/0232543 A1 | 9/2010 | Sampath et al. | |
| 2010/0260154 A1 | 10/2010 | Frank et al. | |
| 2010/0273506 A1 | 10/2010 | Stern-Berkowitz et al. | |
| 2010/0279707 A1 | 11/2010 | Fischer et al. | |
| 2010/0322184 A1 | 12/2010 | Xiao | |
| 2011/0059752 A1 | 3/2011 | Garin et al. | |
| 2011/0103338 A1 | 5/2011 | Astely et al. | |
| 2011/0124347 A1 | 5/2011 | Chen et al. | |
| 2011/0188438 A1 | 8/2011 | Lee et al. | |
| 2011/0237270 A1 | 9/2011 | Noh et al. | |
| 2011/0317641 A1 | 12/2011 | Noh et al. | |
| 2012/0027110 A1 | 2/2012 | Han et al. | |
| 2012/0046047 A1 | 2/2012 | Popovic et al. | |
| 2012/0057498 A1 | 3/2012 | Han et al. | |
| 2012/0120842 A1 | 5/2012 | Kim et al. | |
| 2012/0120903 A1 | 5/2012 | Kim et al. | |
| 2012/0120917 A1 | 5/2012 | Shimomura et al. | |
| 2012/0165012 A1 | 6/2012 | Fischer et al. | |
| 2012/0188129 A1 | 7/2012 | Ameti et al. | |
| 2012/0189041 A1 | 7/2012 | Ko et al. | |
| 2012/0229337 A1 | 9/2012 | Parker | |

FOREIGN PATENT DOCUMENTS

| | | |
|---|---|---|
| CN | 1595836 A | 3/2005 |
| CN | 1628488 A | 6/2005 |
| CN | 1826538 A | 8/2006 |
| CN | 101048994 A | 10/2007 |
| EP | 1148755 A1 | 10/2001 |
| EP | 1041746 B1 | 8/2003 |
| EP | 1355450 A1 | 10/2003 |
| EP | 1396730 A1 | 3/2004 |
| EP | 1887823 A1 | 2/2008 |
| EP | 1898542 A1 | 3/2008 |
| JP | 2003520532 A | 7/2003 |
| JP | 2004101254 A | 4/2004 |
| JP | 2007089113 A | 4/2007 |
| JP | 2008002866 A | 1/2008 |
| JP | 2008236382 A | 10/2008 |
| JP | 2008236383 A | 10/2008 |
| JP | 2010500794 A | 1/2010 |
| JP | 2010525633 A | 7/2010 |
| KR | 100824044 B1 | 4/2008 |
| RU | 2179371 C1 | 2/2002 |
| RU | 2233033 C2 | 7/2004 |
| TW | I223534 B | 11/2004 |
| WO | 0154422 A2 | 7/2001 |
| WO | 03055272 A1 | 7/2003 |
| WO | 2004104621 | 12/2004 |
| WO | 2005041602 A1 | 5/2005 |
| WO | 2005081012 A1 | 9/2005 |
| WO | 2006109538 A1 | 10/2006 |
| WO | 2008073706 A1 | 6/2008 |
| WO | 2008127185 A1 | 10/2008 |
| WO | 2009149104 A2 | 12/2009 |

OTHER PUBLICATIONS

3GPP TS 25.215 V8.2.0 (Sep. 2008), 3rd Generation Partnership Project; Technical Specification Group Radio Access Network: Physical layer—Measurements (MD) (Re ease 8), Sep. 2008.

3GPP TS 25.305 V8.0.0 (Dec. 2007), 3rd Generation Partnership Project; Technical Specification Group Radio Access Network; Stage 2 functional specification of User Equipment (LiE) positioning in UTRAN (t=Zelease 8), Dec. 2007.

Chan Y.T, et al., "A Simple and Efficient Estimator for Hyperbolic Location", IEEE Trans. Signal Processing, vol. 42, No. 5, pp. 1905-1915, Aug. 1994.

Ericsson: "Evaluation Of IP-DL Positioning Techniques Using Common Simulation Parameters", TSG-RAN Working Group 1 Meeting 8, Ad Hoc 17, TSGR1#8(99)g88, Manhattan, USA, Oct. 12-15, 1999.

Evaluation of Positioning Measurement Systems, Source-, Ericsson, T1 P1.5 8-110, May 15, 1998.

Evaluation parameters for positioning studies, Source: Qualcomm Europe, 3GPP TSG-RAN WG1 #56, R1-090853, Feb. 9-13, 2009, Athens, Greece.

"Functional description, Location Services (LCS), Stage 2", (Release 1999) Functional Description, 3GPP TS 03.71 V8.9.0 (Jun. 2004).

Further positioning evaluations, Source: Qualcomm Europe, 3GPP TSG-RAN WG1 #56, R1-090851—Feb. 9-13, 2009, Athens, Greece.

Greenstein J.L, et al., "A New Path—Gam/Delay—Spread Propagation Model for Digital Cellular Channels", IEEE Transactions on Vehicular Technology, vol. 46, No. 2, op. 477-485, May 1997.

International Search Report and Written Opinion—PCT/US2009/057527, International Search Authority—European Patent Office—Mar. 11, 2010.

Motorola: "Impact of Supporting "Blank" Subframes" 3GPP TSG RAN Plenary Meeting No. 42 Dec. 5, 2008, XP002589696Athens, Greece Retrieved from the Internet:URL:http://www.3gpp.org/ftp/tsg_ran/tsg_ran/TSGR_42/docs/ [retrieved on Jun. 28, 2010.

Patwari N, et al., "Relative Location Estimation in Wireless Sensor Networks", IEEE Transactions on Signal Processing, Vol. 51, No. 8, Aug. 2003.

Phy layer specification impact of positioning improvements, Source: quatcomm Europe, 3GPP TSG-RAN WG1 #56, R1-090852, Feb. 9-13, 2009, Athens, Greece.

Positioning Support for LTE, 3GPP TSG RAN#42, RP-080995, Dec. 2-5, 2008, Athens, Greece.

Qualcomm Europe: Impact of Blank Subframes on Intrafrequency Measurements GPP TSG-RAN WG4 No. 49 Nov. 6, 2008, XP002589698Prague, CZ Retrieved from the Internet:URL:http://www.3gpp.org/ftp/tsg_ran/wg4_radio/TSGR4_49/Documents/ [retrie.

Qualcomm Europe: "Way forward on forward compatible subframes for Rel-8"3GPP TSG RAN Plenary Meeting No. 42 Dec. 5, 2008, XP002589697Athens, Greece Retrieved from the Internet:URL:http://www.3gpp.org/ftp/tsg ran/tsg_ran/TSGR_42/docs/[re.

Qualcomm Europoe "On OTDOA in LTE" 3GPP Draft R1-090353, 3rd Generation Partnership Porject (3GPP) Mobile Competence Centre, 650, Rout Des Lucioles F-06921 Sophia-Antipolis Cedex France No Ljubljana Jan. 8, 2009.

Recapitulation of the IPDL positioning method, Source: Encsson, TSG-RAN Working Group 1 meeting #4 TSGR1#4 (99)346, Apr. 18-20, 1999, Shin-Yokohama, Japan.

(56) References Cited

OTHER PUBLICATIONS

"Stage 2 functional specification of User Equipment (UE) positioning in UTRAN" (Release 9) Technical Specification 3GPP TS 25.305 V9.0.0 (Dec. 2009).

Taiwan Search Report—TW098131633—TIPO—Apr. 19, 2013.

Time Aligned iP-DL positioning technique, Source: Motorola, TSG-RAN Working Group 1, Ah Hoc 17, TSGR1#: 9 b79, Meeting 7, Aug. 30-Sep. 3, 1999, Hannover, Germany.

Ward P W: "A Design Technique to Remove the Correlation Ambiguity in Binary Offset Carrier (BOC) Spread Spectrum Signals" Proceedings of the Ion National Technical Meeting, The Institute of Navigation, US, Jan. 26, 2004, pp. 886-896, XP001207302 the whole document.

Wu Q, et al., "CDMA2000 Highly Detectable Pilot" Communications Workshops, 2008. ICC Workshops 08. IEEE International Conference On, IEEE, Piscataway, NJ, USA, May 19, 2008, pp. 16-20, XP031265196 ISBN: 978-1-4244-2052-0 p. 1, Left-Hand Column, Line 8-p. 1, Right-Hand Column, Line 31.

Xiao J, et al., "Research of TDOA Based Self-localization Approach in Wireless Sensor Network", Intelligent Robots and Systems, 2006 IEEE/RSJ International Conference on, IEEE, PI, Oct. 1, 2006, pp. 2035-2040, XP031006391, ISBN: 978-1-4244-0258-8.

\* cited by examiner

SYNCHRONIZING A BASE STATION IN A WIRELESS COMMUNICATION SYSTEM

RELATED APPLICATIONS

This application is related to and claims priority from U.S. Provisional Patent Application Ser. No. 61/098,360 filed Sep. 19, 2008, for "Wireless Network Synchronization using Coordinated Silence," and from U.S. Provisional Patent Application Ser. No. 61/115,465 filed Nov. 17, 2008, for "Timing Synchronization Based on Backhaul Messaging for Silencing an Asynchronous Neighbor Cell."

TECHNICAL FIELD

The present disclosure relates generally to communication systems. More specifically, the present disclosure relates to synchronizing a base station in a wireless communication system.

BACKGROUND

Wireless communication systems have become an important means by which many people worldwide have come to communicate. A wireless communication system may provide communication for a number of mobile devices, each of which may be serviced by a base station. Examples of mobile devices include cellular phones, personal digital assistants (PDAs), handheld devices, wireless modems, laptop computers, personal computers, etc.

As wireless communication becomes more popular, there are new challenges to accommodating large call volumes and maintaining call quality in a cost-efficient manner. One way to increase efficiency is to maximize the data rate of transmissions by base stations. Synchronized base stations cause less interference for neighboring base stations than asynchronous base stations, thus allowing higher data rates. Therefore, benefits may be realized by improved methods and apparatus for synchronizing a base station in a wireless communication system.

DETAILED DESCRIPTION

Figure 1:
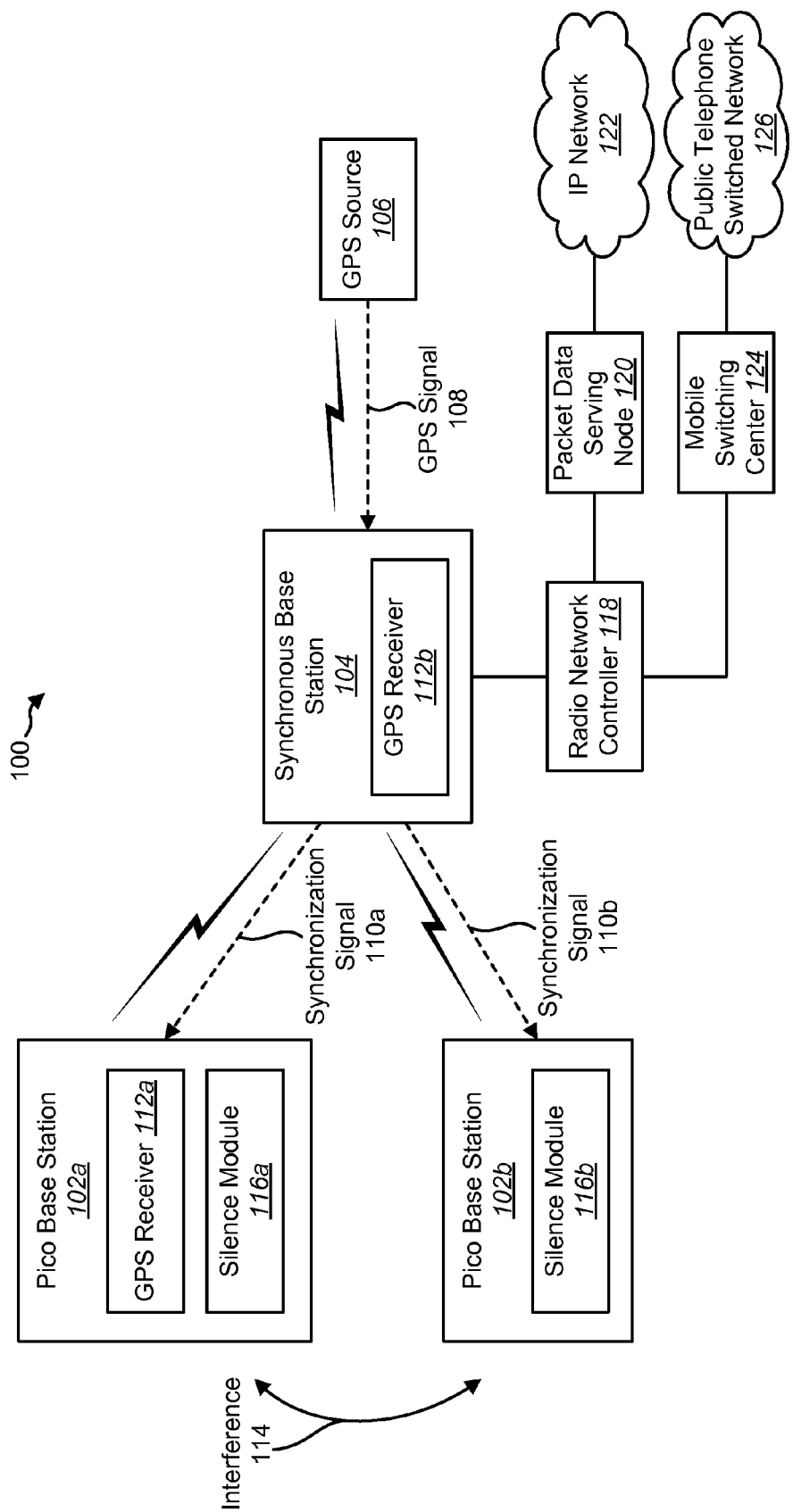
FIG. 1 is a block diagram illustrating a wireless communication system for synchronizing base stations.

A method for synchronizing a wireless communication system is disclosed. A silence duration for a base station is determined based on a time required for a neighbor base station to obtain or maintain synchronization. All transmissions from the base station are ceased for the silence duration. The ceasing may occur periodically every tracking period in the wireless communication system. In one configuration, the base station may be a synchronous base station. The silence duration may be further based on a stratum level of the synchronous base station that indicates a number of base stations between the synchronous base station and a global timing source node, including the global timing source node. The silence duration may be of length n*T where n is the stratum level of the synchronous base station and T is the time required for a neighbor base station to obtain or maintain synchronization. A starting silence time for the silence duration may also be determined as a time when a tracking period for the wireless communication system (P) divides evenly into a network-wide global time. A network-wide global time may be received from the neighbor base station or a global timing source node.

In another configuration, the base station may be an asynchronous base station. The silence duration may be further based on a maximum error between a network-wide global time and an estimated network-wide time, and a total number of stratum levels in the wireless communication system. A starting silence time for the silence duration may be determined based on the estimated network-wide-time and the maximum error between the network-wide global time and the estimated network-wide time. The estimated network-wide time may be received using a backhaul protocol, such as Network Time Protocol (NTP).

In another configuration, the silence duration and a starting silence time for the silence duration may be received in a backhaul message from the neighbor base station. The base station may be a pico base station, a femto base station, or a Home eNodeB. Multiple synchronization signals may be received and a synchronization signal that provides a smallest stratum level may be used. If multiple synchronization signals provide the same stratum level, the synchronization signal with the highest Signal to Interference and Noise Ratio (SINR) may be used. The silence duration may be contiguous or non-contiguous.

An apparatus for synchronizing a wireless communication system is also disclosed. The apparatus includes a processor and memory in electronic communication with the processor. Executable instructions are stored in the memory. The instructions are be executable to determine a silence duration for a base station based on a time required for a neighbor base station to obtain or maintain synchronization. The instructions are also be executable to cease all transmissions from the base station for the silence duration.

An apparatus for synchronizing a wireless communication system is also disclosed. The apparatus includes means for determining a silence duration for a base station based on a time required for a neighbor base station to obtain or maintain synchronization. The apparatus also includes means for ceasing all transmissions from the base station for the silence duration.

A computer-program product for providing multi-region instrument support in an audio player that does not support multi-region instruments is also disclosed. The computer-program product comprises a computer-readable medium having instructions thereon. The instructions include code for determining a silence duration for a base station based on a time required for a neighbor base station to obtain or maintain synchronization. The instructions also include code for ceasing all transmissions from the base station for the silence duration.

FIG. 1 is a block diagram illustrating a wireless communication system 100 for synchronizing base stations 102, 104. The system 100 may include a synchronous base station 104 and a Global Positioning System (GPS) source 106. The synchronous base station 104 may communicate with a radio network controller 118 (also referred to as a base station controller or packet control function). The radio network controller 118 may communicate with a mobile switching center (MSC) 124, a packet data serving node (PDSN) 120 or internetworking function (IWF), a public switched telephone network (PSTN) 126 (typically a telephone company), and an Internet Protocol (IP) network 122 (typically the Internet). The mobile switching center 124 may be responsible for managing the communication between a wireless communication device and the public switched telephone network 126 while the packet data serving node 120 may be responsible for routing packets between a wireless communication device and the IP network 122.

Synchronization among base stations 104 in a wireless communication system 100 may bring many benefits such as interference management or virtual multiple input multiple output (MIMO) capability. Traditionally, system 100 synchronization may be achieved using Global Positioning System (GPS) receivers 112 collocated with base stations 102, 104, i.e., the synchronous base station 104 may include a GPS receiver 112b. However, GPS receivers 112 and/or GPS signals 108 may not always be available for synchronization purposes. For example, GPS receivers 112 may not be included in a base station 102, 104 because of manufacturing cost considerations or power consumption limitations. As used herein, the term "synchronous" describes a base station 102, 104 that is capable of accurately tracking a timing reference used in the system 100. Conversely, the term "asynchronous" describes a base station 102, 104 that is not capable of accurately tracking a timing reference used in the system 100. Additionally, a base station 102, 104 may include a GPS receiver 112, but lack line-of-sight to the GPS source 106, e.g., a GPS satellite. In such scenarios, alternative synchronization strategies may be used to synchronize base stations. One example is the heterogeneous deployment in Long Term Evolution Advanced (LTE-A) or Ultra Mobile Broadband Advanced (UMB-A). In some configurations, pico base stations 102a-b may be placed in addition to the normal base stations 104 to enhance network throughput. As used herein, the term "pico" or "pico base station" refers to a device that is smaller and less powerful than a base station 104 and capable of communicating with wireless devices and a wireless communication system 100. Similarly, the present systems and methods are also applicable to femto cells, also known as femto nodes, or Home eNodeBs, or access point base stations, where the term "femto" or "femto base station" refers to a device that is smaller and less powerful than a base station 104 and capable of communicating with wireless devices and a wireless communication system 100. In other words, the terms "pico" and "femto" may be used interchangeably herein. The term "macro" or "macro base station" refers to a traditional base station 104 that is larger and more powerful than a pico base station 102.

In exemplary network environments, each femto base station, also known as femto node, may be coupled to a wide area network (e.g., the Internet) and a mobile operator core network via a DSL router, a cable modem, a wireless link, or other connectivity means. Each femto node may be configured to serve associated wireless devices, such as, for example, access terminals or user equipment, and, optionally, alien access terminals. In other words, access to femto nodes may be restricted, whereby a given access terminal may be served by a set of designated (e.g., home) femto node(s) but may not be served by any non-designated femto nodes (e.g., a neighbor's femto node). The owner of a femto node may subscribe to mobile service, such as, for example, 3G mobile service, offered through the mobile operator core network. In addition, an access terminal may be capable of operating both in macro environments and in smaller scale (e.g., residential) network environments. In other words, depending on the current location of the access terminal, the access terminal may be served by an access node of a macro cell mobile network or by any one of a set of femto nodes (e.g., the femto nodes and that reside within a corresponding user residence). For example, when a subscriber is outside his home, he is served by a standard macro base station or macro access node and when the subscriber is at home, he is served by a femto node. Here, it should be appreciated that a femto node may be backward compatible with existing access terminals.

A femto base station or femto node may be deployed on a single frequency or, in the alternative, on multiple frequencies. Depending on the particular configuration, the single frequency or one or more of the multiple frequencies may overlap with one or more frequencies used by a macro base station. In some aspects, an access terminal may be configured to connect to a preferred femto node (e.g., the home femto node of the access terminal) whenever such connectivity is possible. For example, whenever the access terminal is within a user's residence, it may be desired that the access terminal communicate only with the home femto node.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes that reside within the corresponding user residence). In some implementations, a node may be restricted to not provide, for at least one node, at least one of: signaling, data access, registration, paging, or service.

Referring back to FIG. 1, pico base stations 102 may be placed indoors. Therefore, a pico base station 102a may include a GPS receiver 112a, but be unable to receive a GPS signal 108. Alternatively, a pico base station 102b may not include a GPS receiver 112. Non-GPS pico base stations 102 may use a synchronization signal 110 from a GPS base station 104 or GPS derived base station, (i.e., those able to track GPS base station's synchronization signal 110), for timing. The synchronization signals 110 may be wireless or wired, e.g., one pico base station 102a may receive a wireless synchronization signal 110a while another pico base station 102b may receive a wired synchronization signal 110b. A multiple level synchronization hierarchy may be established when the non-GPS pico base stations 102 are able hear the neighboring GPS base station 104 or GPS derived base stations.

However, signal interference 114 may be a major limiting factor in an unplanned deployment. Detrimental interference 114 may hinder the ability of the non-GPS pico base station 102 to listen to the desired synchronization signal 110 over the air. This may be particularly true in heterogeneous deployments where the pico base stations 102 may not have good geometry, and could jam other neighboring pico base stations 102. In other words, two asynchronous pico base stations 102 may interfere with each other and prevent each other from synchronizing with the synchronous base station 104, i.e., two nearby asynchronous pico base stations 102 may produce so much interference 114 for each other that neither of them receives a good signal to interference ratio (SIR) on the synchronization signal 110 from the synchronous base station 104. Similarly, synchronization signals 110 at a pico base station 102 may interfere with one another such that the pico base station 102 may not be able to use any of them.

Therefore, the pico base stations 102 may include silence modules 116a-b that may allow the pico base stations 102 to achieve synchronization by using a network wide coordinated silence. Alternatively, or in addition to, the silence modules 116a-b may be in a femto base station, i.e., a Home eNodeB or a relay. While the silence modules 116 are illustrated only on the pico base stations 102, macro base stations 104 may also use the techniques described herein to achieve synchronization. The silence module 116 may operate using hierarchical information or messages sent from other base stations 102, 104.

The present systems and methods may be used by base stations 102, 104 to initially acquire timing (the asynchronous timing method may be used for this) as well as to maintain that timing (the synchronous method may be used for this). For example, oscillators on pico base stations 102 and femto base stations may not be high quality. Therefore, the pico base stations 102 and femto base stations may need to periodically track synchronization signals 110.

In one configuration, a silence module 116 may use hierarchical information to periodically silence base stations 102, 104 based on their stratum level within the system 100 and their synchronization status. As used herein, the term "stratum level" or "stratum" for a pico base station 102 refers to the smallest number of intermediate synchronous nodes between the pico base station 102 and the GPS source 106, including the GPS source node 106. For example, the stratum level of the illustrated pico base stations 102 is two while the stratum level of the illustrated synchronous base station 104 is one. Based on the stratum level, the pico base stations 102 within the system may stay silent for a period of time long enough to allow base stations 102, 104 with the same or lower stratum level to synchronize. In other words, synchronous pico base stations 102 with a low stratum level may stay silent, (i.e., refrain from transmitting any data), for a shorter period of time than synchronous pico base stations 102 with a high stratum level. Durations for different stratum levels may be calculated and stored for efficiency. Additionally, lists of silence intervals for each stratum level may be defined by a particular standard, (e.g., 3GPP), or provided by a configuration entity. The periods of silence may be based on an actual global time that acts as a network-wide global time, e.g., Coordinated Universal Time (UTC). While the present systems and methods below are described using UTC, any suitable global time standard may be used.

However, an asynchronous pico base station 102 may not have knowledge of the actual global time, e.g., it does not have a GPS receiver 112 or cannot receive the GPS signal 108 because it is indoors. Therefore, the silence module 116 may use an estimated global time, or estimated network-wide time, to determine a beginning silence time and a silence duration, e.g., using Network Time Protocol (NTP). Since the silence module 116 may rely on the estimated global time when silencing asynchronous pico base stations 102, the duration of silence may be larger for asynchronous pico base stations 102 than for synchronous pico base stations 102.

Rather than periodic silence, the silence module 116 may alternatively use a message-based configuration to silence interfering pico base stations 102. In a message-based configuration, the silence module 116 may detect interfering pico base stations 102 and send a message to the interfering pico base stations 102 requesting them to stay silent for a predetermined period of time. During the silence period, the requesting base station 102, 104 may acquire timing information, e.g., UTC.

Figure 2:
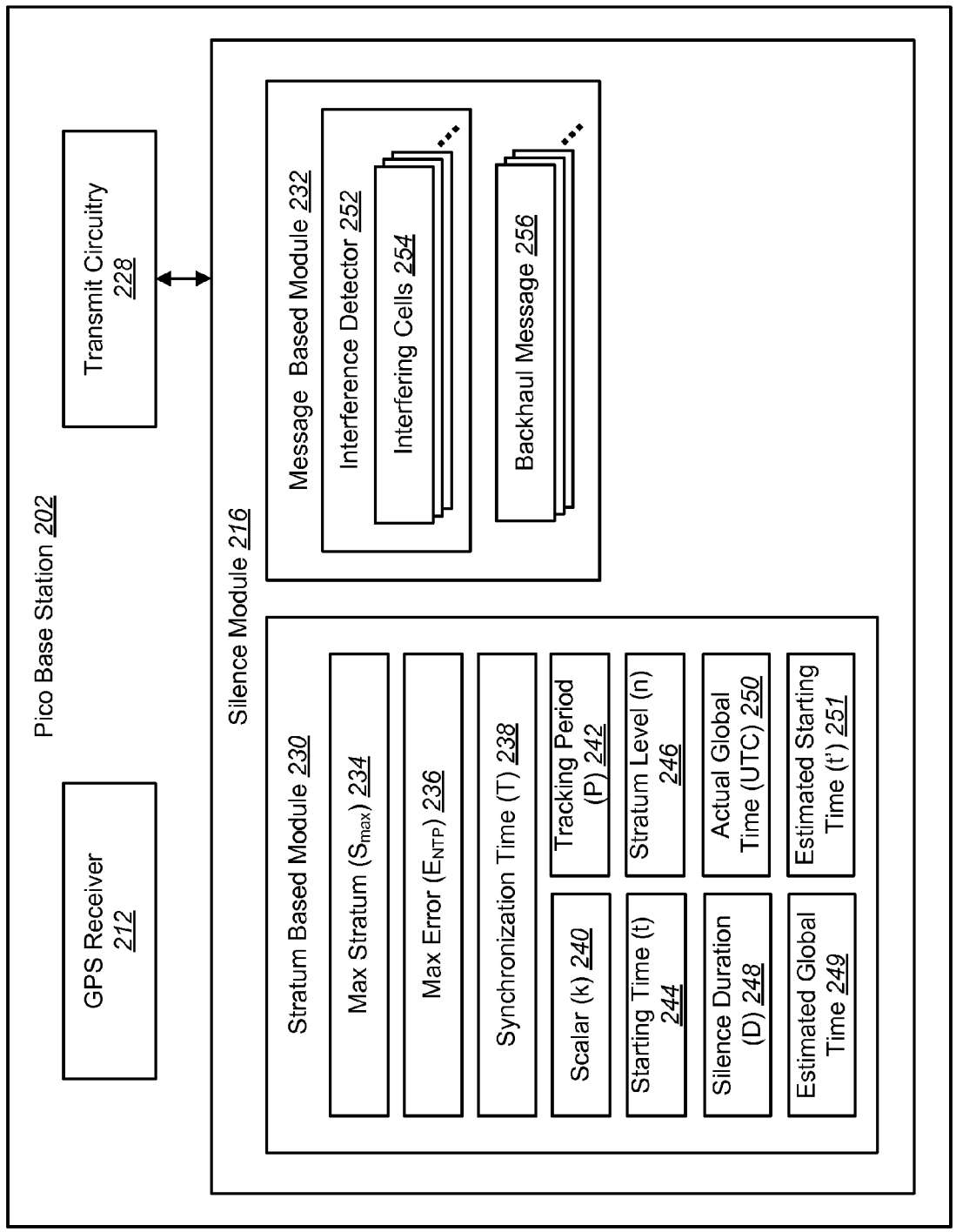
FIG. 2 is a block diagram illustrating a pico base station with a silence module.

FIG. 2 is a block diagram illustrating a pico base station 202 with a silence module 216. The pico base station 202 may include a GPS receiver 212, although it may not be able to receive a GPS signal 108. If the pico base station 202 is not synchronized, either from a GPS signal 108 or from another synchronous base station 104, the pico base station 202 may cause interference with its transmissions. Therefore, the silence module 216 may determine when the pico base station 202 should be silent and control transmit circuitry 228 accordingly. In other words, silence module 216 may send control messages that cease all transmissions from the pico base station 202 based on a stratum based algorithm or a message based algorithm.

A stratum based module 230 may determine periodic silences for the pico base station 202. If the pico base station 202 is synchronous, the pico base station 202 may have an actual global time 250, e.g., the Coordinated Universal Time (UTC) 250. The duration of silence for a synchronous pico base station 202 may be dependent on the stratum level (n) 246. The silence interval may be synchronized to start at starting time (t) 244, when a tracking period (P) 242 divides evenly into the UTC 250, i.e., UTC mod P=0. The tracking period (P) 242 is the length of time between synchronization events, e.g., 2 seconds. The silence duration (D) 248 for a synchronous pico base station 202 at a stratum n 246 may be nT, where the synchronization time (T) 238 is the time required for achieving synchronization, i.e., D=nT.

Since an asynchronous pico base station 202 may not have access to the UTC 250, asynchronous pico base stations 202 may determine the periodic silence starting time (t) 244 using the Network Time Protocol (NTP). Using NTP, the pico base station 202 may receive an estimated global time 249 from an NTP server using a series of NTP messages. Then, the starting time (t) 244 of the silence interval may depend on the accuracy of its estimated global time. If $E_{NTP}$ 236 is the maximum error between the UTC and estimated global time 249, then the asynchronous pico base station 202 may remain silent for a duration (D) 248 of $2*E_{NTP}+S_{max}*T$, where $S_{max}$ 234 is the maximum stratum in the wireless communication system 100 and the synchronization time (T) 238 is the time required for achieving synchronization. The starting time (t) 244 for an asynchronous pico base station 202 may occur when a scaled tracking period (kP) divides evenly into $(t+E_{NTP})$, (i.e., $(t+E_{NTP})$ mod kP=0), where k 240 is a scalar that is greater than or equal to 1. In other words, an asynchronous pico base station 202 may estimate the synchronous starting time (t') 251 at which UTC mod P=0 using the NTP estimated global time 249 instead of using the UTC 250. Then, to account for the inherent error in the estimated global time 249, the asynchronous pico base station 202 may be silenced $E_{NTP}$ 236 before and after the estimated starting time (t') 251 plus $S_{max}*T$.

For pico base stations 202 attempting to synchronize from another base station 104 at stratum n, the stratum based module 230 may reduce the number of interfering base stations 102, 104 to the number of base stations 102, 104 with a stratum level 246 less than or equal to n as well as asynchronous base stations 104.

Upon initialization, the asynchronous pico base station 202 may not transmit for multiple silence periods and attempt synchronization. If it fails to achieve synchronization, it may use an NTP estimated global time 249 to perform the silence and attempt to receive synchronization. $E_{NTP}$ 236 may be bounded by half of the round trip time of an NTP measurement, e.g., if the round trip time to an NTP server is 100 milliseconds, $E_{NTP}$ 236 may be less than or equal to 50 milliseconds.

Pico base stations 202 that can receive multiple synchronization signals 110 may use the one that provides them the smallest stratum level 246. If multiple pico base stations 202 or macro base stations 104 provide the same stratum level 246, then the one with the highest Signal to Interference and Noise Ratio (SINR) may be chosen.

As discussed above, pico base stations 202 that do not have access to a GPS signal 108 may acquire their timing from other macro base stations 104 or pico base stations 202 that have a higher stratum access to timing, i.e., lower stratum level 246. Such timing acquisition and tracking may be subject to interference 114 by surrounding cells. Coordinated silence, as used by the stratum based module 230, may be used to reduce such interference during time tracking. Asynchronous pico base stations 202 may not have the actual global time, UTC 250, and hence may not know with enough precision when to be silent. In some cases, relying on less accurate timing information for silence may result in conservative silencing of asynchronous pico base stations 202. If asynchronous pico base stations 202 continue to transmit, the previously synchronous base stations 102, 104 around them may be unable to track time from their respective source, creating more asynchronous base stations 102, 104, and so on. In other words, a single asynchronous pico base station 202 may unsynchronize other base stations 102, 104. This may lead to an uncontrolled reaction, where more and more base stations 102, 104 become asynchronous causing yet more base stations 102, 104 to lose synchronization, resulting in inefficiencies.

Therefore, in addition to the stratum based module 230, the silence module 216 may alternatively use a message based module 232 to silence interfering base stations 102, 104. A synchronous pico base station 202 may detect interference from an interfering asynchronous cell 254 during the time tracking period using an interference detector 252. The pico base station 202 may then send a backhaul message 256 to the interfering cell 254, requesting the interfering cell 254 remain silence for a certain period of time. The silence duration may be specified in the backhaul message 256 or predetermined for all silence intervals. The starting time for the silence interval may be specified in the backhaul message 256 or as soon as the interfering base station 254 receives the backhaul message 256. This may allow the requesting pico base station 202 to acquire time tracking. Asynchronous pico base stations 202 that are not causing unacceptable interference to other synchronous base stations 102, 104 may not receive requests to be silent, and hence may continue transmission. This may prevent unnecessary periodic silencing of all asynchronous base stations 102, 104 for relatively long periods, while at the same time allowing synchronous base stations 102, 104 to keep time.

Figure 3:
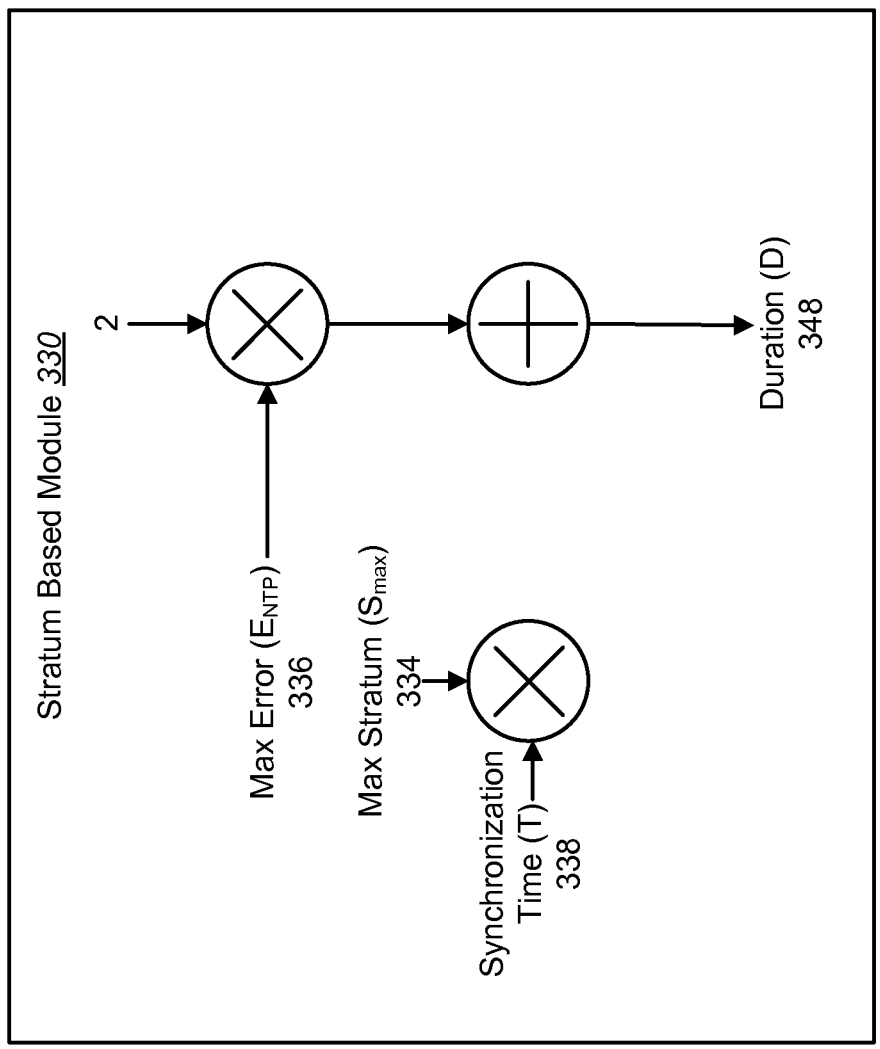
FIG. 3 is a block diagram illustrating a stratum based module that may be in a pico base station.

FIG. 3 is a block diagram illustrating a stratum based module 330 that may be in a pico base station 102. The illustrated configuration shows a duration (D) 348 being calculated for an asynchronous pico base station 102. First, a max error ($E_{NTP}$) 336 may be multiplied by 2. The max error ($E_{NTP}$) 336 may be the max error between an NTP estimated global time 249 and an actual global time, e.g., UTC 250. A max stratum ($S_{max}$) 334 may be multiplied by a synchronization time (T) 338. The max stratum ($S_{max}$) 334 is the maximum stratum, or number of hierarchical layers, in the wireless communication system 100 and the synchronization time (T) 338 is the time required for achieving synchronization within a pico base station 102. The duration (D) 348 may then be calculated as $D=2*E_{NTP}+S_{max}*T$.

Figure 4:
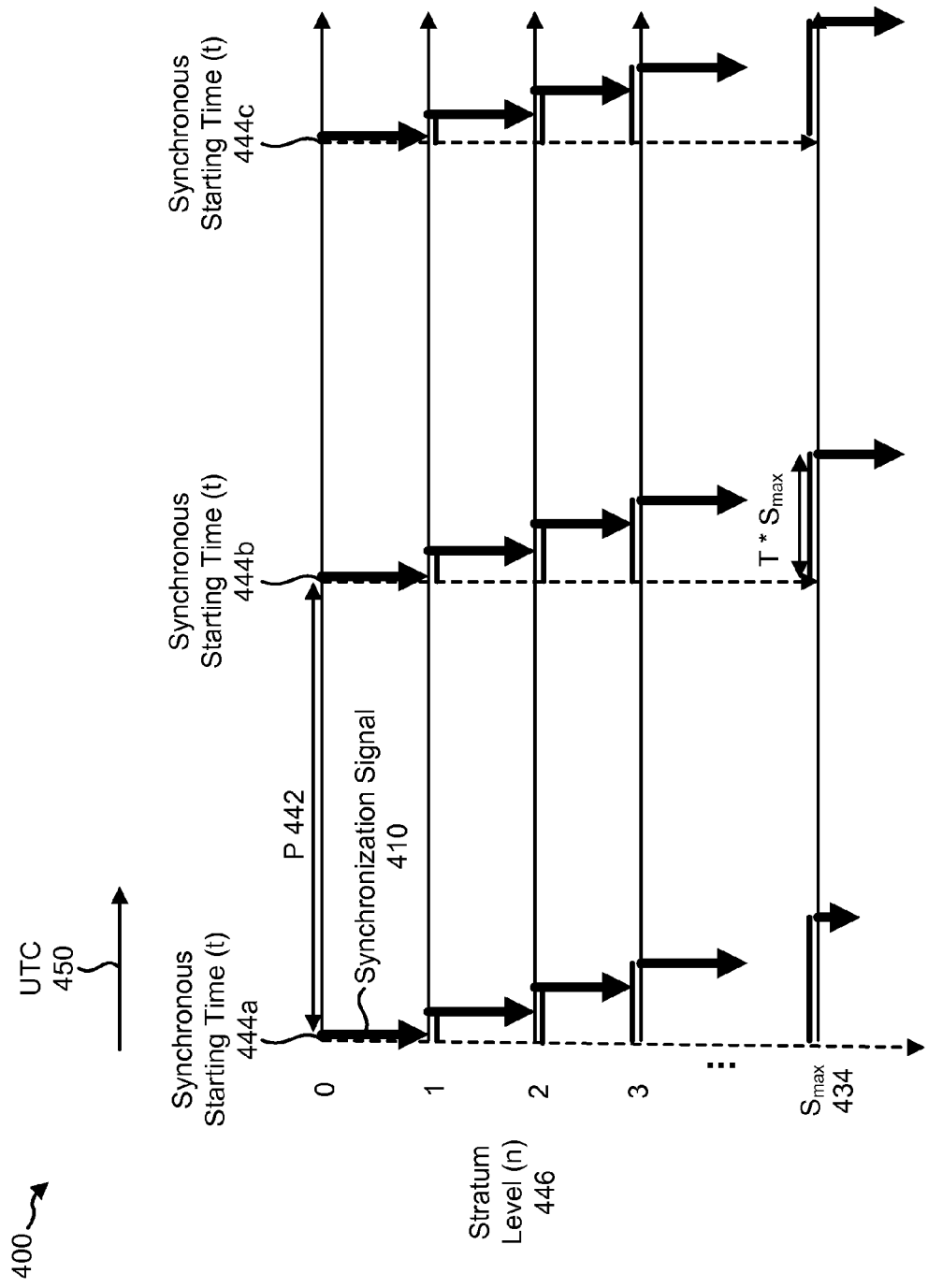
FIG. 4 is a sequence diagram illustrating a wireless communication system for synchronizing base stations using contiguous silence intervals.

FIG. 4 is a sequence diagram 400 illustrating a wireless communication system 100 for synchronizing base stations 102, 104 using contiguous silence intervals. Specifically, the sequence diagram 400 illustrates periodic silencing for synchronous base stations 102, 104. The sequence diagram 400 illustrates synchronization events as a function of an actual global time, (e.g., UTC 450), where the solid vertical arrows represent synchronization signals 410 from one stratum level 446 to another. Each stratum level (n) 446 may include one or more pico base stations 102 or macro base stations 104. The stratum level (n) 446 of a pico base station 202 may be derived from the interval where it receives a synchronization signal 410. For example, if stratum 1 base stations 104 go silent on subframe 1 and stratum 2 base stations 102 go silent on subframes 1 and 2, then if a new base station 104 sees a signal on subframe 2, then it knows it is getting that synchronization signal 410 from a stratum 1 base station 104. Hence the new base station 104 is stratum 2.

The dashed vertical arrows represent synchronous starting times (t) 444a-c at which synchronous pico base stations 102 may begin a silence interval and the horizontal bars represent the duration of the silence interval, i.e., the number of silent subframes for base stations 102, 104 at each stratum 446. As illustrated in FIG. 4, the silence intervals may be contiguous. The synchronous starting times (t) 444a-c may occur when a tracking period (P) 442 divides evenly into the UTC 450, i.e., UTC mod P=0. For example, if P 442 is two seconds, a synchronous starting time may occur every two seconds, based on the UTC 450. The duration (D) 248 of the silence interval may depend on the stratum level (n) 446. For example, pico base stations 102 at stratum level one remain silent for one synchronization time (T) period, pico base stations 102 at stratum level two remain silent for two synchronization time (T) periods, pico base stations 102 at stratum level three remain silent for three synchronization time (T) periods. Likewise, pico base stations 102 at the maximum stratum level, $S_{max}$ 434, may remain silent for $S_{max}$ synchronization time (T) periods. Therefore, each synchronous base station 102, 104 may remain silent long enough for all base stations 102, 104 with a lower stratum level 446 to synchronize.

Figure 4A:
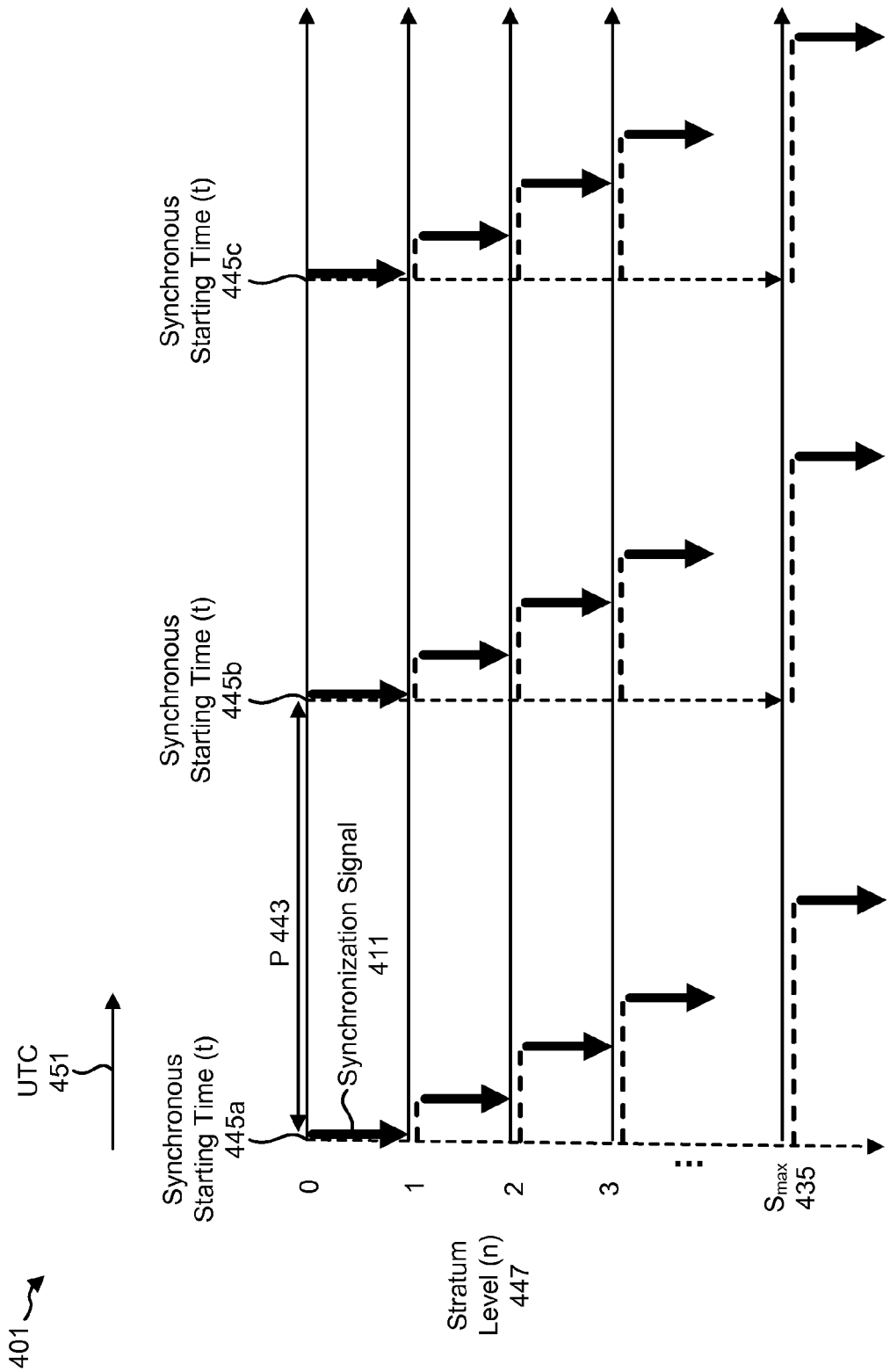
FIG. 4a is a sequence diagram illustrating a wireless communication system for synchronizing base stations using non-contiguous silence intervals.

FIG. 4a is a sequence diagram 401 illustrating a wireless communication system 100 for synchronizing base stations 102, 104 using non-contiguous silence intervals. The actual global time, (e.g., UTC 451), synchronous starting times 445a-c, synchronization signals 411, tracking period (P) 443, stratum level 447, and $S_{max}$ 435 illustrated in FIG. 4a may operate similarly to the actual global time, (e.g., UTC 450), synchronous starting times 444a-c, synchronization signals 410, tracking period (P) 442, stratum level 446, and $S_{max}$ 434 illustrated in FIG. 4.

However, the silence intervals may be non-contiguous in FIG. 4a. For example, if the synchronization time (T) period is 2 ms, the synchronous pico base stations 102 at stratum level (n) one may go silent between 3-4 ms and 7-8 ms, thus silencing for 2 ms total. The synchronous pico base stations 102 at stratum level (n) two may go silent between 3-4 ms, 7-8 ms, 11-12 ms, and 15-16 ms, thus silencing for 4 ms total. Likewise, pico base stations 102 at the maximum stratum level, $S_{max}$ 435, may remain silent for the equivalent $S_{max}$ synchronization time (T) periods, although the silence interval may be non-contiguous.

Figure 5:
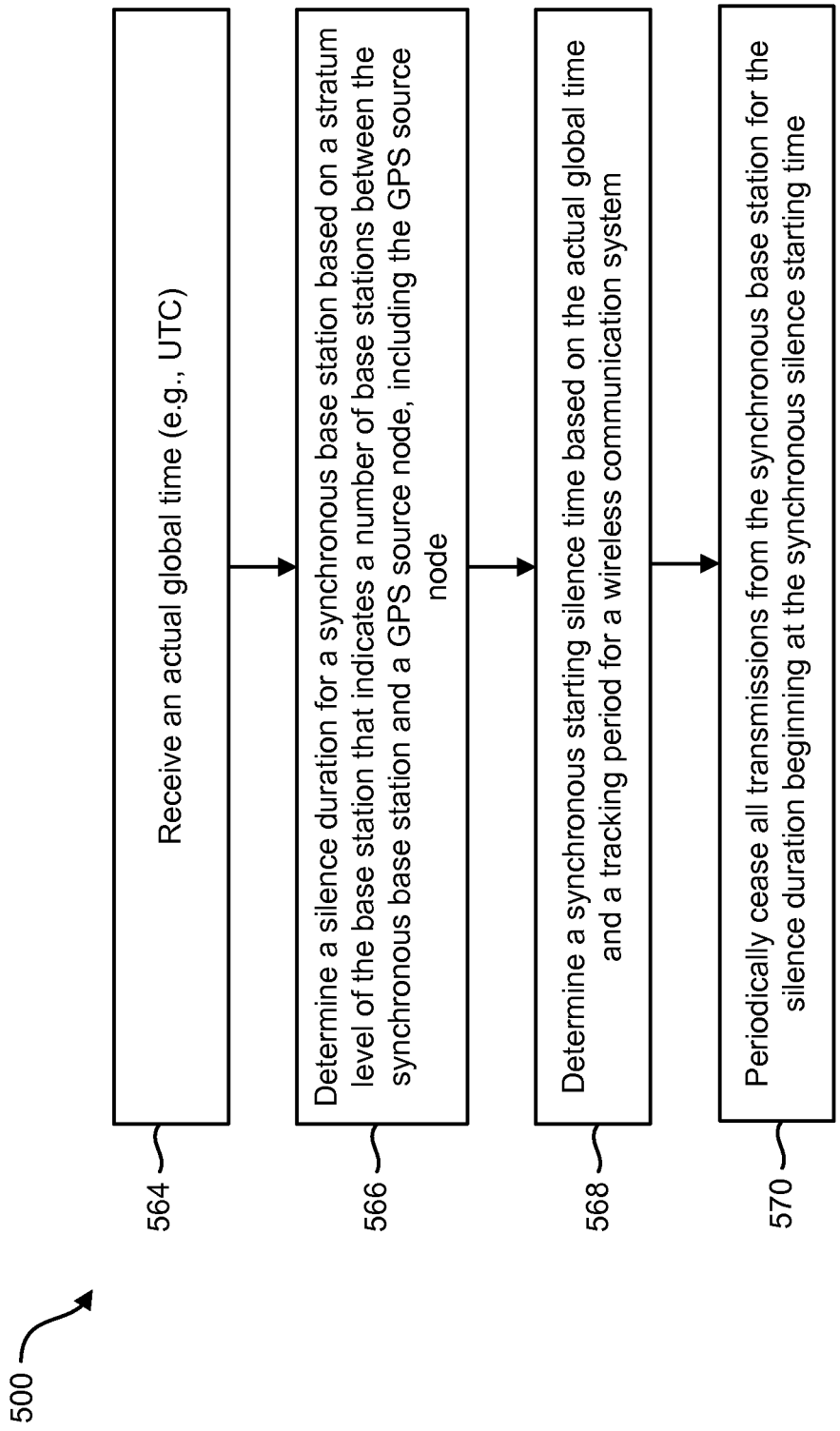
FIG. 5 is a flow diagram illustrating a method for silencing a synchronous base station.

FIG. 5 is a flow diagram illustrating a method 500 for silencing a synchronous base station 102, 104. The method 500 may be performed by a silence module 116 in a pico base station 102 or a macro base station 104. The silence module 116 may receive 564 an actual global time, e.g., UTC 450. The UTC 450 may be received 564 from a GPS signal 108 or a synchronization signal 110 from another base station 102, 104. The silence module 116 may determine 566 a silence duration (D) 248 for a synchronous base station 102 based on a stratum level 246 of the base station 102 that indicates a number of base stations 102, 104 between the synchronous base station 102, 104 and a GPS source node 106, e.g., D=nT. The silence module 116 may also determine 568 a synchronous starting silence time 444 based on the actual global time 450 and a tracking period (P) 442 for the wireless communication system 100, e.g., the synchronous starting silence times 444 may occur when UTC mod P=0. The silence module 116 may also periodically cease 570 all transmissions from the synchronous base station 102, 104 for the silence duration (D) 248 beginning at the synchronous starting silence time 444.

Figure 6:
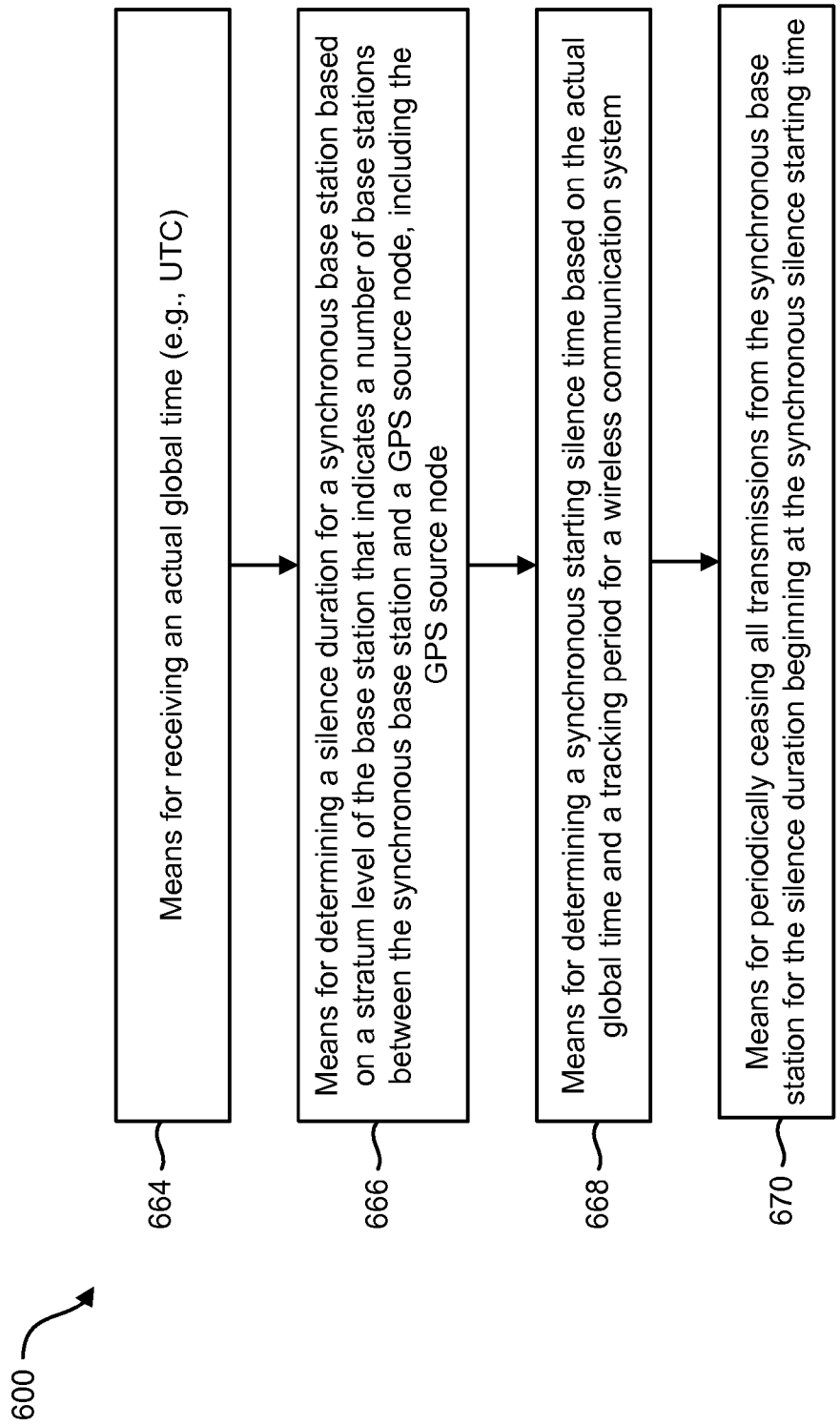
FIG. 6 illustrates means-plus-function blocks corresponding to the method of FIG. 5.

The method 500 of FIG. 5 described above may be performed by various hardware and/or software component(s) and/or module(s) corresponding to the means-plus-function blocks 600 illustrated in FIG. 6. In other words, blocks 564 through 570 illustrated in FIG. 5 correspond to means-plus-function blocks 664 through 670 illustrated in FIG. 6.

Figure 7:
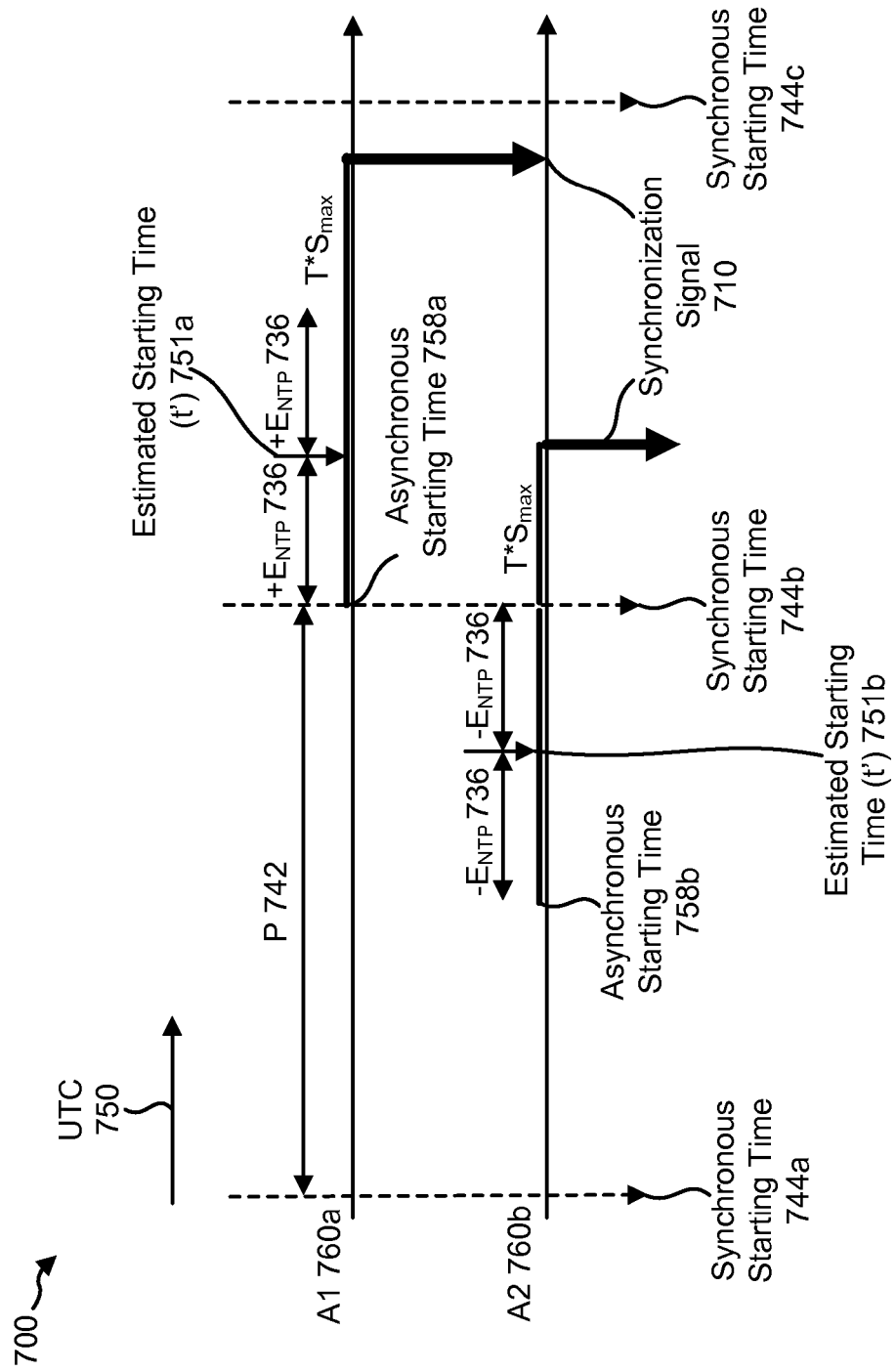
FIG. 7 is another sequence diagram illustrating a wireless communication system for synchronizing base stations.

FIG. 7 is another sequence diagram 700 illustrating a wireless communication system 100 for synchronizing base stations 102, 104. However, the sequence diagram 700 illustrates periodic silencing for asynchronous base stations 102, 104. The sequence diagram 700 illustrates synchronization events as a function of an actual global time, (e.g., UTC 750) where the solid vertical arrows represent synchronization signals 710 from one base station 102, 104 to another. As discussed above, asynchronous pico base stations 102 may not be able to receive the UTC 750 for a variety of reasons. In such configurations, the pico base station 102 may receive an estimated global time 249 using NTP. Like before, the dashed vertical arrows represent synchronous starting times (t) 744a-c at which synchronous pico base stations 102 may begin a silence interval and the horizontal bars represent the duration of the silence interval.

The synchronous starting times (t) 744a-c may be based on the UTC 750. In contrast, the asynchronous starting times 758a-b may be based on the NTP estimated global time 249. Therefore, the error between the NTP estimated global time 249 and the UTC 750 may be accounted for using the maximum error, $E_{NTP}$ 736. Specifically, the asynchronous starting times (t) 758a-b may occur such that mod (t+$E_{NTP}$, kP)=0, where k is a scalar that is greater than or equal to 1. In other words, an asynchronous pico base station A1 760a may calculate an estimated starting time (t') 751a using an NTP estimated global time 249. However, to account for the error in the NTP estimated global time 249, the actual asynchronous starting time 758a may be offset by $E_{NTP}$ 736. Similarly an asynchronous pico base station A2 760b may calculate an estimated starting time (t') 751b using an NTP estimated global time 249. However, to account for the error in the NTP estimated global time 249, the actual asynchronous starting time 758b may be offset by $E_{NTP}$ 736. The duration of the silence for an asynchronous pico base station 102 may be $2*E_{NTP}+S_{max}*T$.

In one configuration, $E_{NTP}$ 736 is much larger than $S_{max}$ 734, so an asynchronous pico base station 102 may be required to be silent much longer than a synchronous pico base station 102. For example, if T is 2 milliseconds, a system 100 has 2 stratum, and $E_{NTP}$ 736 is 50 milliseconds, the maximum duration for a silence interval for a synchronous pico base station 102 would be 4 milliseconds while the duration of a silence interval for an asynchronous base station 102 would be 104 milliseconds.

Figure 8:
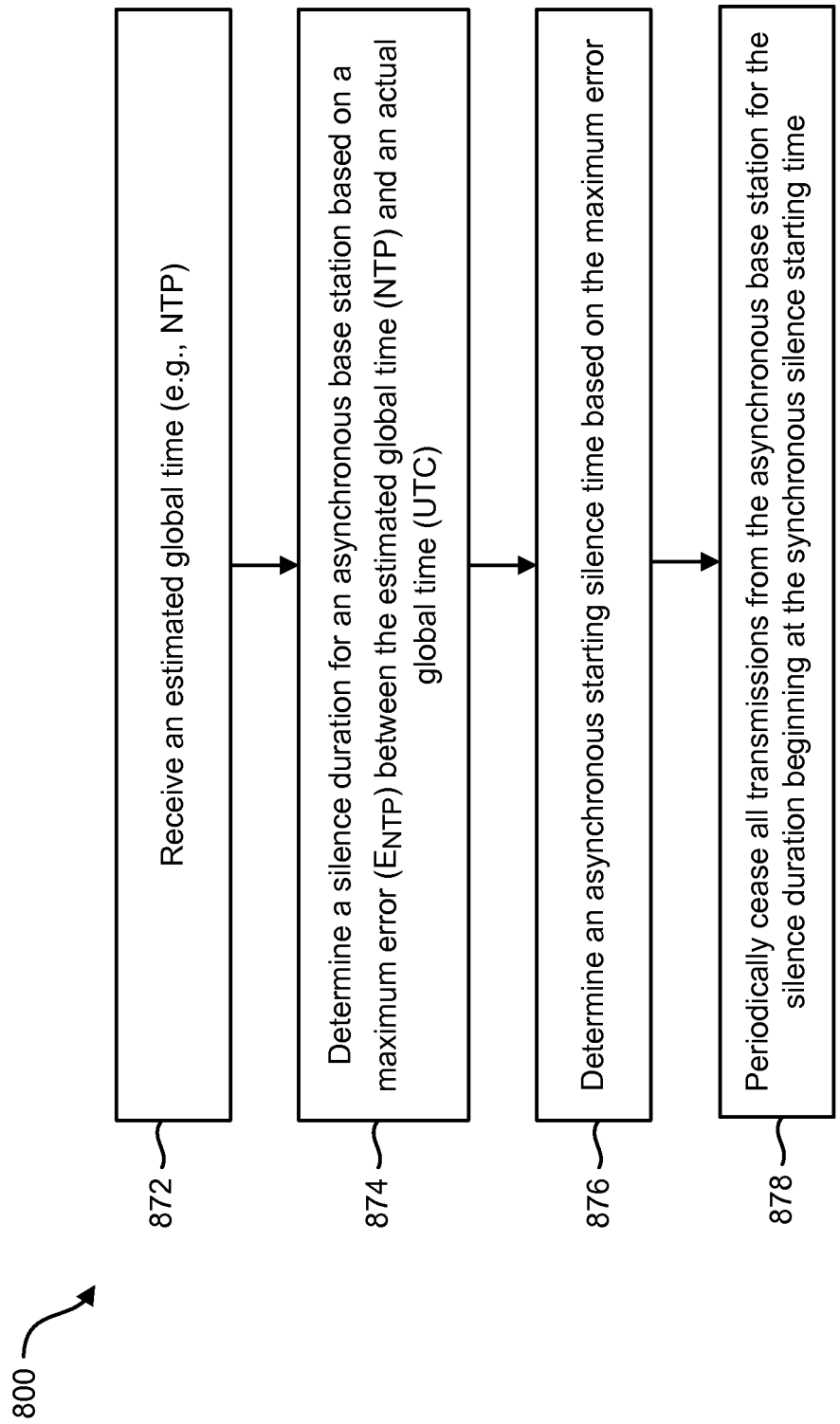
FIG. 8 is a flow diagram illustrating a method for silencing an asynchronous base station.

FIG. 8 is a flow diagram illustrating a method 800 for silencing an asynchronous base station 102, 104. The method 800 may be performed by a silence module 116 in a pico base station 102 or a macro base station 104. Since an asynchronous base station 102, 104 may not have access to the actual global time, UTC 750, the silence module 116 may receive 872 an estimated global time 249, e.g., via NTP. The silence module 116 may then determine 874 a silence duration (D) 248 for an asynchronous base station 102 based on a max error, $E_{NTP}$ 736, between an actual global time, UTC 750, and the NTP estimated global time 249. In one configuration, the duration (D) 248 for an asynchronous timing interval is $2*E_{NTP}+S_{max}*T$ where the max stratum ($S_{max}$) 234 is the maximum stratum, or hierarchical layers, in the wireless communication system 100 and the synchronization time (T) 238 is the time required for achieving synchronization within a base station 102, 104. The silence module 116 may also determine 876 an asynchronous starting silence time 758 based on the max error, $E_{NTP}$ 736, between an actual global time, UTC 750, and the estimated global time 249. In other words, an asynchronous base station 102, 104 may estimate the synchronous starting time (t') 751 at which UTC mod P=0 using the NTP estimated global time 249 instead of using the UTC 750. Then, to account for the inherent error in the NTP estimated global time 249, the asynchronous base station 102, 104 may be silenced $E_{NTP}$ 736 before and after the estimated starting time (t') 751 plus $S_{max}*T$. The silence module 116 may also periodically cease 878 all transmissions from the asynchronous base station 102 for the silence duration (D) 248 beginning at the asynchronous starting silence time 758.

Figure 9:
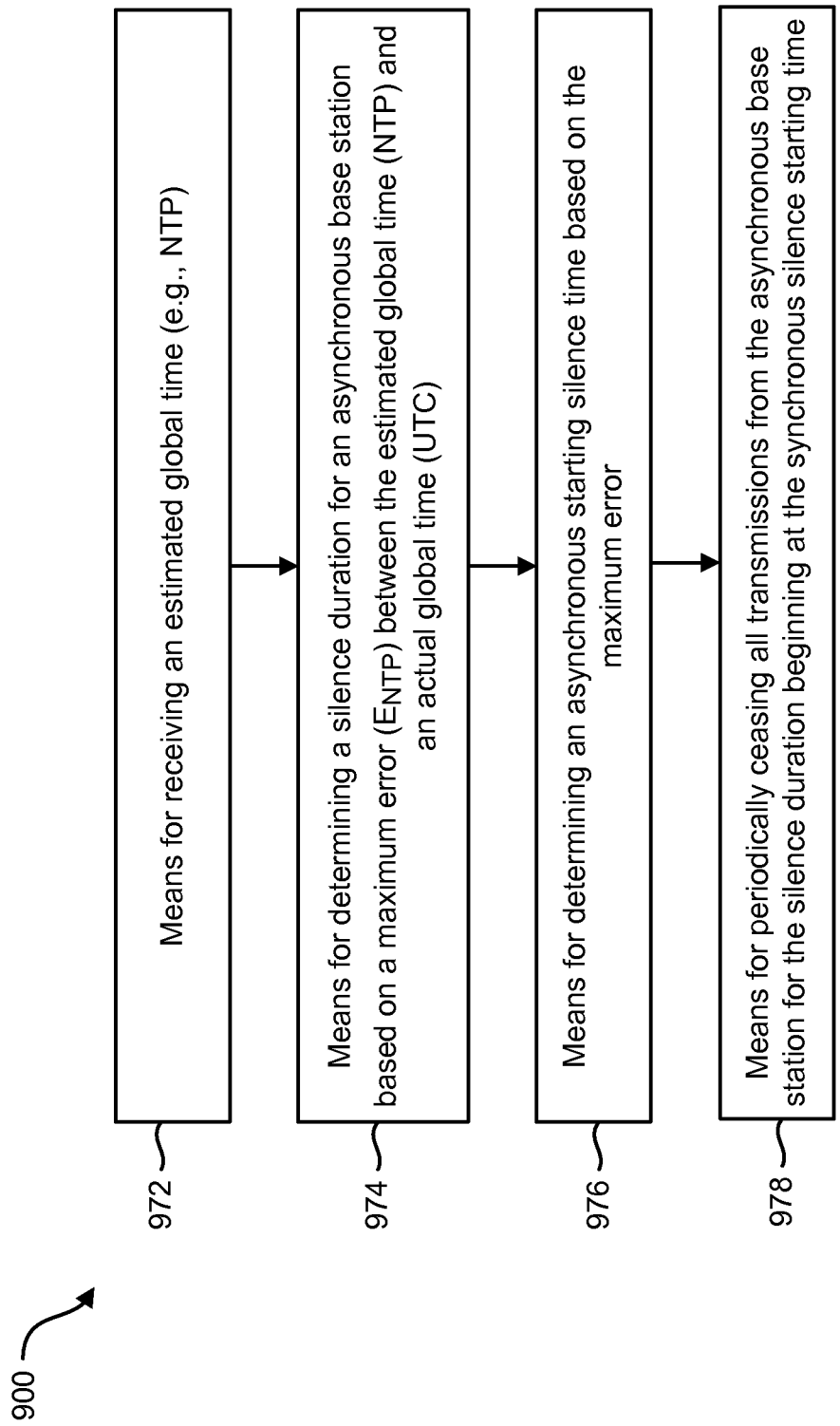
FIG. 9 illustrates means-plus-function blocks corresponding to the method of FIG. 8.

The method 800 of FIG. 8 described above may be performed by various hardware and/or software component(s) and/or module(s) corresponding to the means-plus-function blocks 900 illustrated in FIG. 9. In other words, blocks 872 through 878 illustrated in FIG. 8 correspond to means-plus-function blocks 972 through 978 illustrated in FIG. 9.

Figure 10:
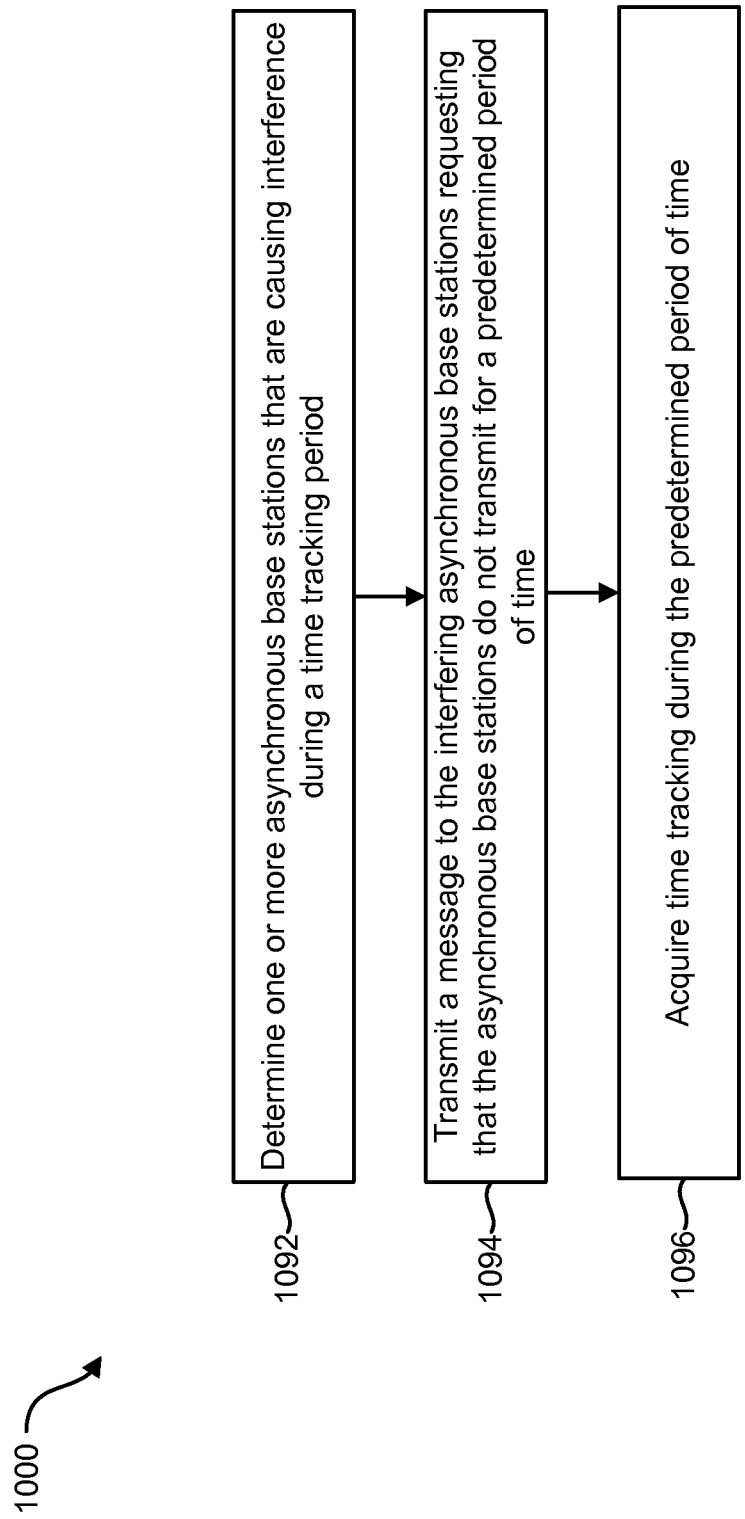
FIG. 10 is a flow diagram illustrating a method 1000 for silencing interfering base stations.

FIG. 10 is a flow diagram illustrating a method 1000 for silencing interfering base stations 102, 104. The method 1000 may be performed by a message based module 232 in a silence module 216 in either a pico base station 102 or a macro base station 104. The message based module 232 may determine 1092 one or more asynchronous base stations 102, 104 that are causing interference during a time tracking period. The message based module 232 may also transmit 1094 a message to the interfering asynchronous base stations 102 requesting that the interfering asynchronous base stations 102, 104 do not transmit for a predetermined period of time, e.g., a silence interval. The duration of the silence interval may be the time required for the sending base station 104 to synchronize and may be included in a backhaul message. The starting silence time for the silence interval may also be sent in the message or may occur as soon as the interfering base station 102, 104 receives the backhaul message. The message based module 216 may also acquire 1096 time tracking during the predetermined period of time. Additionally, the backhaul message may include an NTP estimate error.

Figure 11:
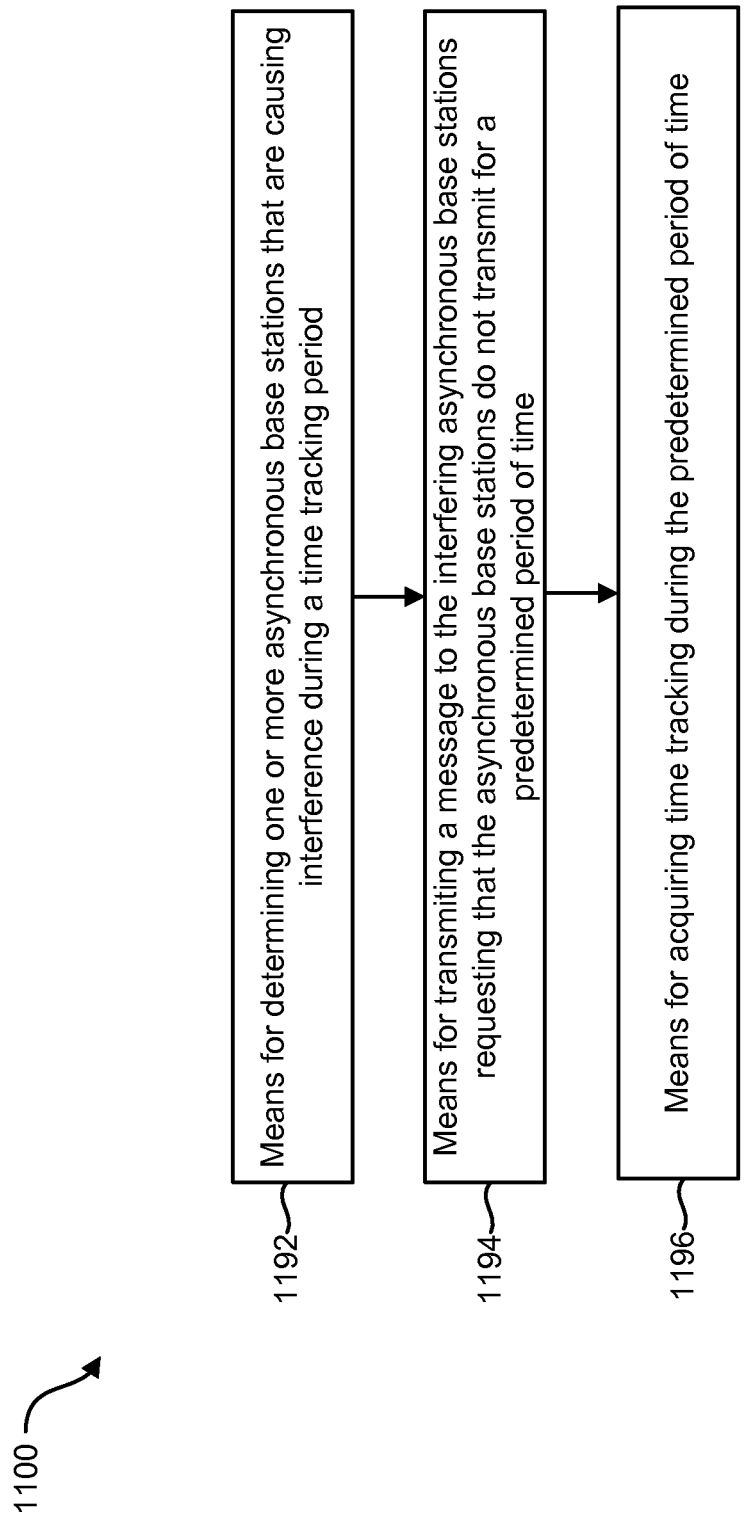
FIG. 11 illustrates means-plus-function blocks corresponding to the method of FIG. 10.

The method 1000 of FIG. 10 described above may be performed by various hardware and/or software component(s) and/or module(s) corresponding to the means-plus-function blocks 1100 illustrated in FIG. 11. In other words, blocks 1092 through 1096 illustrated in FIG. 10 correspond to means-plus-function blocks 1192 through 1196 illustrated in FIG. 11.

Figure 12:
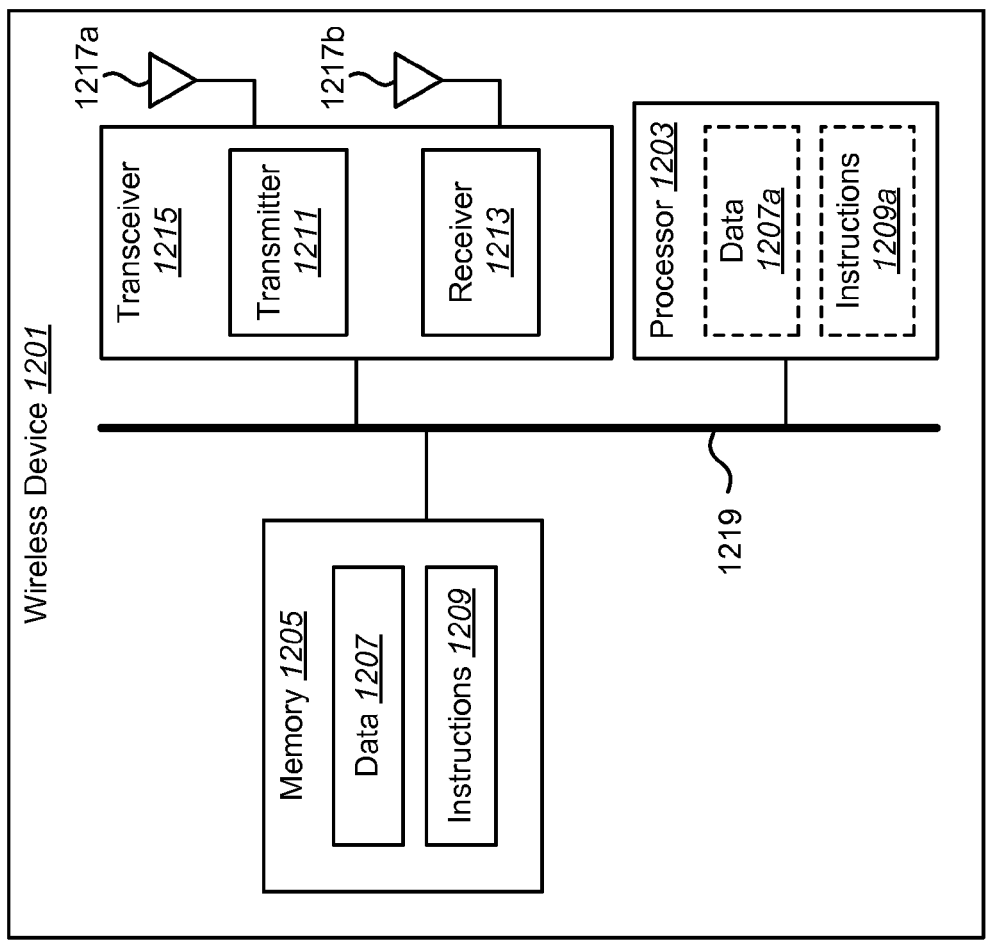
FIG. 12 illustrates certain components that may be included within a wireless device.

FIG. 12 illustrates certain components that may be included within a wireless device 1201. The wireless device 1201 may be a pico base station 102 or a macro base station 104.

The wireless device 1201 includes a processor 1203. The processor 1203 may be a general purpose single- or multi-chip microprocessor (e.g., an ARM), a special purpose microprocessor (e.g., a digital signal processor (DSP)), a microcontroller, a programmable gate array, etc. The processor 1203 may be referred to as a central processing unit (CPU). Although just a single processor 1203 is shown in the wireless device 1201 of FIG. 12, in an alternative configuration, a combination of processors (e.g., an ARM and DSP) could be used.

The wireless device 1201 also includes memory 1205. The memory 1205 may be any electronic component capable of storing electronic information. The memory 1205 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1207 and instructions 1209 may be stored in the memory 1205. The instructions 1209 may be executable by the processor 1203 to implement the methods disclosed herein. Executing the instructions 1209 may involve the use of the data 1207 that is stored in the memory 1205. When the processor 1203 executes the instructions 1207, various portions of the instructions 1209a may be loaded onto the processor 1203, and various pieces of data 1207a may be loaded onto the processor 1203.

The wireless device 1201 may also include a transmitter 1211 and a receiver 1213 to allow transmission and reception of signals between the wireless device 1201 and a remote location. The transmitter 1211 and receiver 1213 may be collectively referred to as a transceiver 1215. An antenna 1217 may be electrically coupled to the transceiver 1215. The wireless device 1201 may also include (not shown) multiple transmitters, multiple receivers, multiple transceivers and/or multiple antenna.

The various components of the wireless device 1201 may be coupled together by one or more buses, which may include a power bus, a control signal bus, a status signal bus, a data bus, etc. For the sake of clarity, the various buses are illustrated in FIG. 12 as a bus system 1219.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 5, 8, and 10, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for synchronizing a wireless communication system, comprising:
   determining a silence duration for a base station based on a stratum level of the base station, the stratum level corresponding to a number of base stations including a global timing source node and zero or more intermediate base stations between the base station and the global timing source node; and
   ceasing all transmissions from the base station for the silence duration.

2. The method of claim 1, wherein the ceasing occurs periodically every tracking period in the wireless communication system.

3. The method of claim 2, wherein the base station is a synchronous base station.

4. The method of claim 3, wherein the silence duration is of length n*T where n is the stratum level of the synchronous base station and T is the time required for a neighbor base station to obtain or maintain synchronization.

5. The method of claim 3, further comprising determining a starting silence time for the silence duration as a time when a tracking period P for the wireless communication system divides evenly into a network-wide global time.

6. The method of claim 3, further comprising receiving a network-wide global time from a neighbor base station or the global timing source node.

7. The method of claim 2, wherein the base station is an asynchronous base station.

8. The method of claim 7, wherein the silence duration is further based on a maximum error between a network-wide global time and an estimated network-wide time.

9. The method of claim 8, further comprising determining a starting silence time for the silence duration based on the estimated network-wide time and the maximum error between the network-wide global time and the estimated network-wide time.

10. The method of claim 8, further comprising receiving the estimated network-wide time using a backhaul protocol.

11. The method of claim 10, wherein the backhaul protocol is Network Time Protocol (NTP).

12. The method of claim 1, further comprising receiving the silence duration in a backhaul message from a neighbor base station.

13. The method of claim 1, further comprising receiving a starting silence time for the silence duration in a backhaul message from a neighbor base station.

14. The method of claim 1, wherein the base station is a pico base station, a femto base station, or a Home eNodeB.

15. The method of claim 1, further comprising receiving multiple synchronization signals and using a synchronization signal that provides a smallest stratum level.

16. The method of claim 15, further comprising using a synchronization signal with the highest Signal to Interference and Noise Ratio (SINR) if multiple synchronization signals provide a same stratum level.

17. The method of claim 1, wherein the silence duration is contiguous.

18. The method of claim 1, wherein the silence duration is non-contiguous.

19. An apparatus for synchronizing a wireless communication system, comprising:
   a processor;
   memory in electronic communication with the processor;
   instructions stored in the memory, the instructions being executable by the processor to:
      determine a silence duration for a base station based on a stratum level of the base station, the stratum level corresponding to a number of base stations including a global timing source node and zero or more intermediate base stations between the base station and the global timing source node; and
      cease all transmissions from the base station for the silence duration.

20. The apparatus of claim 19, wherein the instructions are further executable to periodically cease all transmissions every tracking period in the wireless communication system.

21. The apparatus of claim 20, wherein the base station is a synchronous base station.

22. The apparatus of claim 21, wherein the silence duration is of length n*T where n is the stratum level of the synchronous base station and T is the time required for a neighbor base station to obtain or maintain synchronization.

23. The apparatus of claim 21, further comprising instructions executable to determine a starting silence time for the silence duration as a time when a tracking period P for the wireless communication system divides evenly into a network-wide global time.

24. The apparatus of claim 21, further comprising instructions executable to receive a network-wide global time from a neighbor base station or the global timing source node.

25. The apparatus of claim 20, wherein the base station is an asynchronous base station.

26. The apparatus of claim 25, wherein the silence duration is further based on a maximum error between a network-wide global time and an estimated network-wide time.

27. The apparatus of claim 26, further comprising instructions executable to determine a starting silence time for the silence duration based on the estimated network-wide time and the maximum error between the network-wide global time and the estimated network-wide time.

28. The apparatus of claim 26, further comprising instructions executable to receive the estimated network-wide time using a backhaul protocol.

29. The apparatus of claim 28, wherein the backhaul protocol is Network Time Protocol (NTP).

30. The apparatus of claim 19, further comprising instructions executable to receive the silence duration in a backhaul message from a neighbor base station.

31. The apparatus of claim 19, further comprising instructions executable to receive a starting silence time for the silence duration in a backhaul message from a neighbor base station.

32. The apparatus of claim 19, wherein the base station is a pico base station, a femto base station, or a Home eNodeB.

33. The apparatus of claim 19, further comprising instructions executable to receive multiple synchronization signals and use a synchronization signal that provides a smallest stratum level.

34. The apparatus of claim 33, further comprising instructions executable to use a synchronization signal with the highest Signal to Interference and Noise Ratio (SINR) if multiple synchronization signals provide a same stratum level.

35. The apparatus of claim 19, wherein the silence duration is contiguous.

36. The apparatus of claim 19, wherein the silence duration is non-contiguous.

37. An apparatus for synchronizing a wireless communication system, comprising:
means for determining a silence duration for a base station based on a stratum level of the base station, the stratum level corresponding to a number of base stations including a global timing source node and zero or more intermediate base stations between the base station and the global timing source node; and
means for ceasing all transmissions from the base station for the silence duration.

38. The apparatus of claim 37, wherein the ceasing occurs periodically every tracking period in the wireless communication system.

39. The apparatus of claim 38, wherein the base station is a synchronous base station.

40. The apparatus of claim 39, wherein the silence duration is of length n*T where n is the stratum level of the synchronous base station and T is the time required for a neighbor base station to obtain or maintain synchronization.

41. The apparatus of claim 39, further comprising means for determining a starting silence time for the silence duration as a time when a tracking period P for the wireless communication system divides evenly into a network-wide global time.

42. The apparatus of claim 39, further comprising means for receiving a network-wide global time from the neighbor base station or a global timing source node.

43. The apparatus of claim 38, wherein the base station is an asynchronous base station.

44. The apparatus of claim 43, wherein the silence duration is further based on a maximum error between a network-wide global time and an estimated network-wide time.

45. The apparatus of claim 44, further comprising means for determining a starting silence time for the silence duration based on the estimated network-wide time and the maximum error between the network-wide global time and the estimated network-wide time.

46. The apparatus of claim 44, further comprising means for receiving the estimated network-wide time using a backhaul protocol.

47. The apparatus of claim 46, wherein the backhaul protocol is Network Time Protocol (NTP).

48. The apparatus of claim 37, further comprising means for receiving the silence duration in a backhaul message from a neighbor base station.

49. The apparatus of claim 37, further comprising means for receiving a starting silence time for the silence duration in a backhaul message from a neighbor base station.

50. The apparatus of claim 37, wherein the base station is a pico base station, a femto base station, or a Home eNodeB.

51. The apparatus of claim 37, further comprising means for receiving multiple synchronization signals and using a synchronization signal that provides a smallest stratum level.

52. The apparatus of claim 51, further comprising means for using a synchronization signal with the highest Signal to Interference and Noise Ratio (SINR) if multiple synchronization signals provide a same stratum level.

53. The apparatus of claim 37, wherein the silence duration is contiguous.

54. The apparatus of claim 37, wherein the silence duration is non-contiguous.

55. A computer-program product for synchronizing a wireless communication system, the computer-program product comprising a non-transitory computer-readable medium having instructions thereon, the instructions comprising:
code for determining a silence duration for a base station based on a stratum level of the base station, the stratum level corresponding to a number of base stations including a global timing source node and zero or more intermediate base stations between the base station and global timing source node; and
code for ceasing all transmissions from the base station for the silence duration.

56. The computer-program product of claim 55, wherein the ceasing occurs periodically every tracking period in the wireless communication system.

57. The computer-program product of claim 56, wherein the base station is a synchronous base station.

58. The computer-program product of claim 57, wherein the silence duration is of length n*T where n is the stratum level of the synchronous base station and T is the time required for a neighbor base station to obtain or maintain synchronization.

59. The computer-program product of claim 57, further comprising code for determining a starting silence time for the silence duration as a time when a tracking period P for the wireless communication system divides evenly into a network-wide global time.

60. The computer-program product of claim 57, further comprising code for receiving a network-wide global time from a neighbor base station or the global timing source node.

61. The computer-program product of claim 56, wherein the base station is an asynchronous base station.

62. The computer-program product of claim 61, wherein the silence duration is further based on a maximum error between a network-wide global time and an estimated network-wide time.

63. The computer-program product of claim 62, further comprising code for determining a starting silence time for the silence duration based on the estimated network-wide time and the maximum error between the network-wide global time and the estimated network-wide time.

64. The computer-program product of claim 62, further comprising code for receiving the estimated network-wide time using a backhaul protocol.

65. The computer-program product of claim 64, wherein the backhaul protocol is Network Time Protocol (NTP).

66. The computer-program product of claim 55, further comprising code for receiving the silence duration in a backhaul message from a neighbor base station.

67. The computer-program product of claim 55, further comprising code for receiving a starting silence time for the silence duration in a backhaul message from a neighbor base station.

68. The computer-program product of claim 55, wherein the base station is a pico base station, a femto base station, or a Home eNodeB.

69. The computer-program product of claim 55, further comprising code for receiving multiple synchronization signals and using a synchronization signal that provides a smallest stratum level.

70. The computer-program product of claim 69, further comprising code for using a synchronization signal with the highest Signal to Interference and Noise Ratio (SINR) if multiple synchronization signals provide a same stratum level.

71. The computer-program product of claim 55, wherein the silence duration is contiguous.

72. The computer-program product of claim 55, wherein the silence duration is non-contiguous.

\* \* \* \* \*